(12) United States Patent
Watanabe et al.

(10) Patent No.: US 11,615,433 B2
(45) Date of Patent: *Mar. 28, 2023

(54) VEHICLE DISPATCH DEVICE

(71) Applicant: TOYOTA JIDOSHA KABUSHIKI KAISHA, Toyota (JP)

(72) Inventors: Junya Watanabe, Sunto-gun (JP); Seiji Arakawa, Sunto-gun (JP); Yuji Sasaki, Toyota (JP); Masafumi Hayakawa, Susono (JP); Naotoshi Kadotani, Sunto-gun (JP); Takashi Hayashi, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/520,090

(22) Filed: Nov. 5, 2021

(65) Prior Publication Data
US 2022/0058675 A1   Feb. 24, 2022

Related U.S. Application Data

(63) Continuation of application No. 16/126,431, filed on Sep. 10, 2018, now Pat. No. 11,210,689.

(30) Foreign Application Priority Data

Oct. 10, 2017   (JP) .............................. JP2017-196776

(51) Int. Cl.
| G06Q 30/02 | (2023.01) |
| G06Q 30/0207 | (2023.01) |
| G05D 1/02 | (2020.01) |

(52) U.S. Cl.
CPC ....... *G06Q 30/0207* (2013.01); *G05D 1/0287* (2013.01); *G05D 2201/0213* (2013.01)

(58) Field of Classification Search
CPC ............. G06Q 30/0207; G05D 1/0287; G05D 2201/0213; G08G 1/202
See application file for complete search history.

(56) References Cited

U.S. PATENT DOCUMENTS

| 8,725,612 B2 | 5/2014 | Mundinger |
| 9,390,431 B2* | 7/2016 | Fletcher ............. G06Q 30/0226 |
| (Continued) | | |

FOREIGN PATENT DOCUMENTS

| CN | 101004858 A | 7/2007 |
| CN | 106448139 A | 2/2017 |
| (Continued) | | |

OTHER PUBLICATIONS

VIA Rail Canada, Late train travel credits for VIA Rail Canada, Jul. 2016, https://www.viarail.ca/en/travel-info/booking/travel-credits (Year: 2016).

*Primary Examiner* — Ilana L Spar
*Assistant Examiner* — Melinda Gieringer
(74) *Attorney, Agent, or Firm* — Sughrue Mion, PLLC

(57) ABSTRACT

A vehicle dispatch device is configured to dispatch a vehicle having an autonomous driving function to a user, the device includes: a search unit configured to search for a first alternative moving object when the vehicle cannot continue the autonomous driving to the destination during the autonomous driving of the vehicle on which the user is boarded, the first alternative moving object to which the user can transfer at a boarding position which is within a predetermined distance from a position on a route to an end position of the autonomous driving of the vehicle, within a predetermined time from alighting from the vehicle; and a grant unit configured to grant a reward to the user when the first alternative moving object does not exist.

9 Claims, 10 Drawing Sheets

(56) References Cited

U.S. PATENT DOCUMENTS

| | | | |
|---|---|---|---|
| 10,419,878 B1* | 9/2019 | Sanchez | H04W 4/025 |
| 2008/0091341 A1* | 4/2008 | Panabaker | G06Q 10/10 |
| | | | 701/533 |
| 2009/0287408 A1 | 11/2009 | Gerdes | |
| 2012/0130727 A1* | 5/2012 | Ahmed | G06Q 30/02 |
| | | | 705/1.1 |
| 2012/0161984 A1 | 6/2012 | Amir | |
| 2013/0046456 A1 | 2/2013 | Scofield et al. | |
| 2014/0350979 A1 | 11/2014 | Paetzold | |
| 2016/0012461 A1* | 1/2016 | Paul | G06Q 10/02 |
| | | | 705/5 |
| 2016/0370194 A1 | 12/2016 | Colijn et al. | |
| 2017/0147959 A1 | 5/2017 | Sweeney et al. | |
| 2017/0191841 A1* | 7/2017 | Marueli | G01C 21/3484 |
| 2017/0364968 A1* | 12/2017 | Gopalakrishnan | |
| | | | G01C 21/3453 |
| 2018/0165731 A1 | 6/2018 | Gopalakrishnan | |
| 2018/0224858 A1 | 8/2018 | Watanabe et al. | |
| 2019/0108539 A1 | 4/2019 | Watanabe | |

FOREIGN PATENT DOCUMENTS

| | | |
|---|---|---|
| JP | 2009-036618 A | 2/2009 |
| JP | 2015-092320 A | 5/2015 |
| JP | 2018-128799 A | 8/2018 |

* cited by examiner

Fig. 4

| VEHICLE IDENTIFICATION NUMBER | VEHICLE POSITION | DRIVING STATE | PRESENCE OR ABSENCE OF DRIVER | PRESENCE OR ABSENCE OF AUTONOMOUS DRIVING FUNCTION | VEHICLE DISPATCH PLAN |
|---|---|---|---|---|---|
| REGISTERED VEHICLE 2A | LONGITUDE: XX LATITUDE: XX | AUTONOMOUS DRIVING | YES | YES | VEHICLE DISPATCH PLAN A |
| REGISTERED VEHICLE 2B | LONGITUDE: XX LATITUDE: XX | MANUAL DRIVING | YES | NO | VEHICLE DISPATCH PLAN B |
| REGISTERED VEHICLE 2C | LONGITUDE: XX LATITUDE: XX | AUTONOMOUS DRIVING | NO | YES | VEHICLE DISPATCH PLAN C |
| REGISTERED VEHICLE 2D | LONGITUDE: XX LATITUDE: XX | MANUAL DRIVING | YES | YES | VEHICLE DISPATCH PLAN D |
| ... | ... | ... | ... | ... | ... |

Fig.5

| USER ID | POINTS | USAGE HISTORY | ... |
|---|---|---|---|
| AAA000 | 100 | ... | ... |
| BBB000 | 1000 | ... | ... |
| CCC000 | 0 | ... | ... |
| DDD000 | 200000 | ... | ... |
| ... | ... | ... | ... |

VEHICLE DISPATCH DEVICE

CROSS-REFERENCE TO RELATED APPLICATION

This application is a continuation of U.S. application Ser. No. 16/126,431 filed Sep. 10, 2018 (allowed), which is based on Japanese Patent Application No. 2017-196776 filed with Japan Patent Office on Oct. 10, 2017. The entire disclosures of the prior applications are considered part of the disclosure of the accompanying continuation application, and are hereby incorporated by reference.

TECHNICAL FIELD

The present disclosure relates to a vehicle dispatch device.

BACKGROUND

U.S. Patent Application Publication No. 2016/0370194 discloses a device that provides a vehicle dispatch service. The device dispatches a vehicle having an autonomous driving function to a boarding position requested by a user. The vehicle autonomously travels to a destination desired by the user. The vehicle proposes an alternative destination when certain type of dangers exist at the destination.

SUMMARY

Incidentally, the vehicle having the autonomous driving function may not be able to continue the autonomous driving before arriving at the destination. Even if the vehicle on which the user is boarded cannot exert the autonomous driving function, when there is a moving object other than the vehicle on which the user is boarded, the user may be able to move to the destination. It is considerable that proposing to transfer to the alternative moving object is more effective than proposing the alternative destination when such an alternative moving object exists. That is because it is possible to avoid disadvantages the user suffers since the user can eventually arrive at the destination.

However, when the alternative moving object does not exist, it is difficult for the user to avoid the disadvantages. In the present technical field, it is desired to provide a vehicle dispatch device that can reduce the disadvantages the user suffers when the vehicle cannot continue the autonomous driving to the destination during the autonomous driving of the vehicle on which the user is boarded.

According to an aspect of the present disclosure, there is provided a vehicle dispatch device configured to dispatch a vehicle having an autonomous driving function to a user. The device is configured to include a search unit and a grant unit. The search unit is configured to search for a first alternative moving object to which the user can transfer at a boarding position, which is within a predetermined distance from a position on a route to an end position of the autonomous driving of the vehicle, within a predetermined time from alighting from the vehicle, when the vehicle cannot continue the autonomous driving to the destination during the autonomous driving of the vehicle on which the user is boarded. The grant unit is configured to grant a reward to the user when the first alternative moving object does not exist.

According to the vehicle dispatch device, the reward is granted to the user by the grant unit when the vehicle cannot continue the autonomous driving to the destination and when the first alternative moving object to which the user can transfer does not exist. The reward is a compensation for the disadvantages. Therefore, the vehicle dispatch device can reduce the disadvantages the user suffers when the vehicle on which the user is boarded cannot continue the autonomous driving to the destination during the autonomous driving of the vehicle.

In an embodiment, the search unit may select a moving object having the shortest transfer time for the user to transfer at the boarding position as the first alternative moving object. In this configuration, it is possible to specify an alternative moving object to which the user can transfer within the shortest time or distance.

In an embodiment, the search unit may search for a second alternative moving object having the autonomous driving function to which the user can transfer at the boarding position after the predetermined time has elapsed when the first alternative moving object does not exist, and the grant unit may grant an additional reward to the user when the user transfers to the second alternative moving object after the predetermined time has elapsed. In this configuration, it is possible to urge the user to positively use the alternative moving object having the autonomous driving function.

According to various aspects of the present disclosure, a vehicle dispatch system that can reduce the disadvantages the user suffers when the vehicle cannot continue the autonomous driving to the destination during the autonomous driving of the vehicle on which the user is boarded, can be provided.

BRIEF DESCRIPTION OF THE DRAWINGS

FIG. 4 illustrates an example of data stored in a server.

FIG. 5 illustrates an example of user data stored in the server.

DETAILED DESCRIPTION

Figure 1:
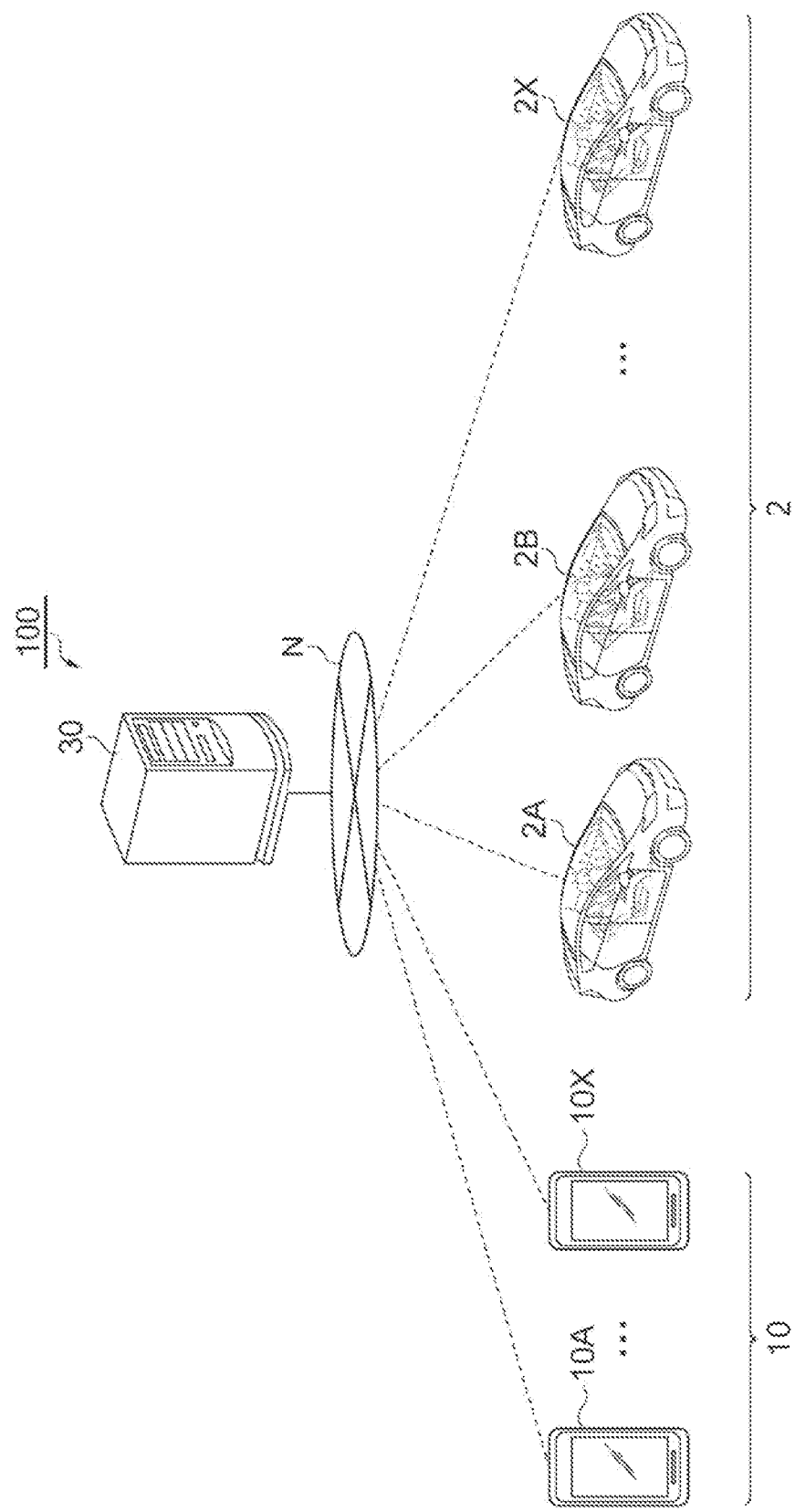
FIG. 1 is a diagram illustrating an example of a configuration of a vehicle dispatch system.

Hereinafter, exemplary embodiments will be described with reference to the drawings. In the descriptions below, the same reference numerals will be given to the same or equivalent elements, and the descriptions thereof will not be repeated.

First Embodiment

Vehicle Dispatch System

FIG. 1 is a diagram illustrating an example of a configuration of a vehicle dispatch system 100. The vehicle dispatch system 100 provides a user with a service for dispatching a vehicle having an autonomous driving function. As illustrated in FIG. 1, the vehicle dispatch system 100 includes a plurality of user devices 10A to 10X and a server 30 (an example of a vehicle dispatch device). The plurality of user devices 10A to 10X is communicably connected to the server 30 via a network N. The network N is, for example, a wireless communication network.

Each of the plurality of user devices 10A to 10X is terminal carried by the user. The user is a member using the vehicle dispatch system 100. The user may be registered in the vehicle dispatch system 100 in advance. An ID for identifying the user may be allocated to each registered user. The plurality of user devices 10A to 10X may have the same configuration. Hereafter, when describing a configuration common to the user devices, a user device 10 will be described as a representative of the terminals.

A plurality of vehicles 2A, 2B, . . . , 2X is communicably connected to the server 30 via the network N. The plurality of vehicles 2A, 2B, . . . , 2X is registered in the vehicle dispatch system 100 in advance. An ID (vehicle identification number) for identifying the vehicle may be allocated to each registered vehicle. The plurality of vehicles 2A, 2B, . . . , 2X includes at least an autonomous driving vehicle. The autonomous driving vehicle is a vehicle on which an autonomous driving system that causes the vehicle autonomously travel towards a destination set in advance. The destination may be set by an occupant such as a driver, or may be autonomously set by the autonomous driving system. The autonomous driving vehicle does not require the driver to perform a driving operation, and travels autonomously. The plurality of vehicles 2A, 2B, . . . , 2X may have the same configuration except for the presence or absence of the autonomous driving function. Hereafter, when describing the configuration common to the vehicles, a vehicle 2 will be described as a representative of the vehicles.

Configuration of Vehicle Dispatch System

Figure 2:
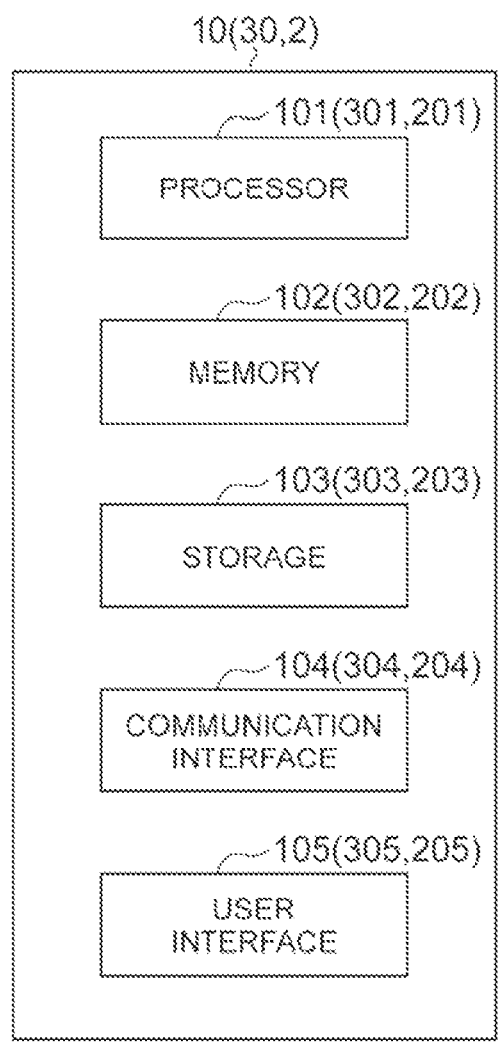
FIG. 2 is a diagram illustrating an example of a hardware configuration of a user device.

FIG. 2 is a diagram illustrating an example of a hardware configuration of the user device 10. As illustrated in FIG. 2, the user device 10 includes a processor 101, a memory 102, a storage 103, a communication interface 104, and a user interface 105, and is configured as a general computer.

The processor 101 is an arithmetic unit such as a central processing unit (CPU). The memory 102 is a storage medium such as read only memory (ROM) or random access memory (RAM). The storage 103 is a storage medium such as a hard disk drive (HDD). The communication interface 104 is a communication device that realizes the data communication. The user interface 105 is an output device such as a liquid crystal or a speaker, and an input device such as a touch panel or a microphone. The processor 101 performs overall management of the memory 102, the storage 103, the communication interface 104, and the user interface 105, and realizes the function of a user device to be described later. The user device 10 may include a global positioning system (GPS) receiver.

Like the user device 10 described above, the server 30 includes a processor 301, a memory 302, a storage 303, a communication interface 304, and a user interface 305. The processor 301 performs overall management of the memory 302, the storage 303, the communication interface 304, and the user interface 305, and realizes the function of the server 30 to be described later.

The vehicle 2 includes an electronic control unit (ECU). Like the user device 10 described above, the ECU includes a processor 201, a memory 202, a storage 203, a communication interface 204, and a user interface 205. The processor 201 performs overall management of the memory 202, the storage 203, the communication interface 204, and the user interface 205, and realizes the function of the vehicle 2 to be described later. The vehicle 2 may be include a GPS receiver. Furthermore, when the vehicle 2 is an autonomous driving vehicle, the vehicle 2 may have a configuration such as sensors (not illustrated) that are generally include in the autonomous driving vehicle.

Function of Vehicle Dispatch System

Figure 3:
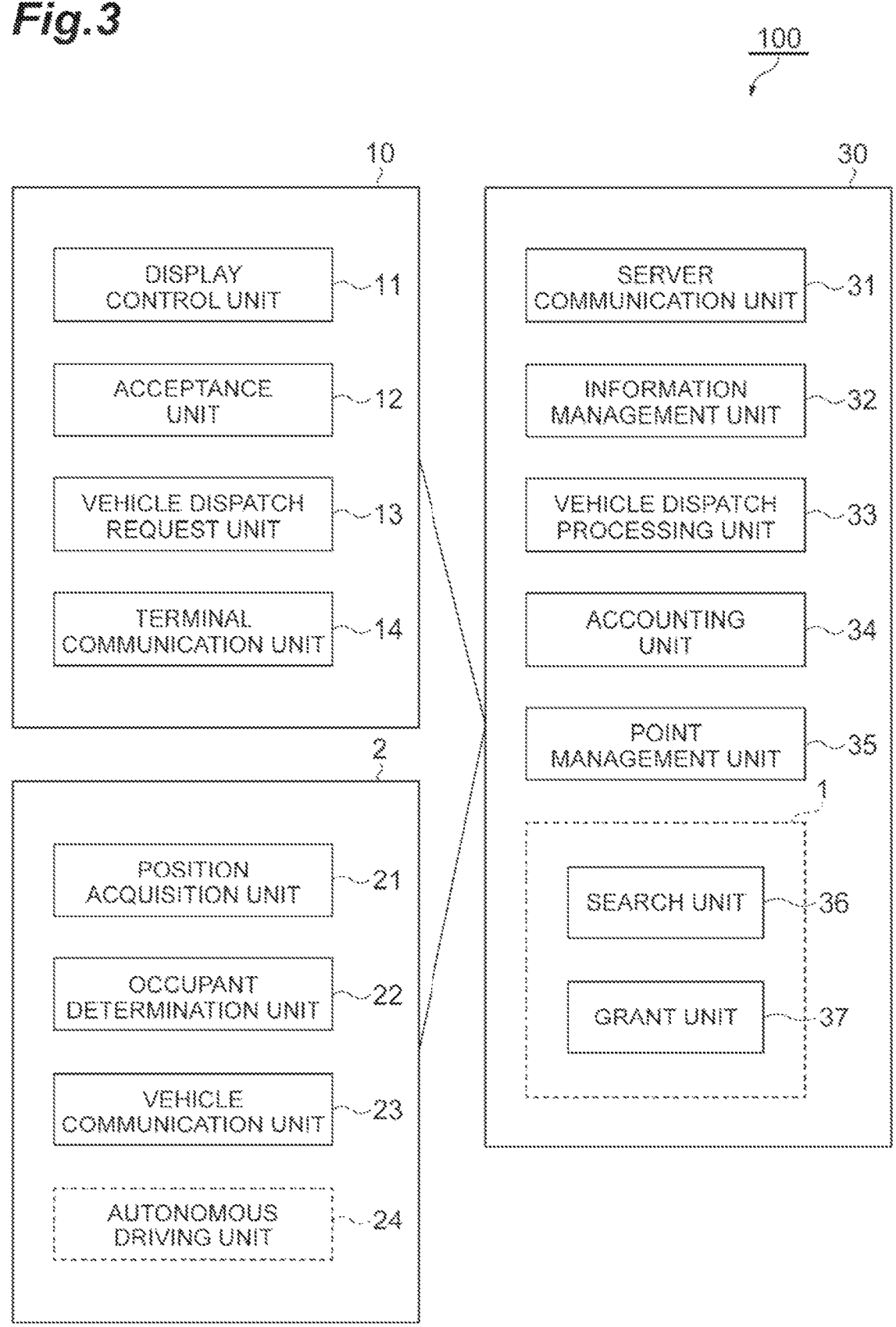
FIG. 3 is a block diagram illustrating an example of functions of the vehicle dispatch system.

FIG. 3 is a block diagram illustrating an example of functions of the vehicle dispatch system 100. First, functions of the user device 10 will be described. As illustrated in FIG. 3, the user device 10 includes a display control unit 11, an acceptance unit 12, a vehicle dispatch request unit 13, and a terminal communication unit 14.

The display control unit 11 displays a display relating to a vehicle dispatch service on the user interface 105. The function of the display control unit 11 is realized mainly by the processor 101 causing the user interface 105 to operate while referring to the memory 102 and the storage 103. The information items displayed by the display control unit 11 are information stored in at least one of the memory 102 and the storage 103 in advance, information accepted by the acceptance unit 12 and fixed by the user operation, information generated by the vehicle dispatch request unit 13, and information received from the terminal information received from the server 30 by the terminal communication unit 14, and the like.

As an example of the display relating to the vehicle dispatch service, the display control unit 11 displays a map that supports the input of a vehicle pick-up position on the user interface 105. The vehicle pick-up position is a position to wait a dispatched vehicle and is a position at which the user boards. The dispatched vehicle is the vehicle that performs the vehicle dispatch service. As an example, the vehicle pick-up position is designated by the user operation. For example, the position on which the user taps the map displayed on the user interface 105 of the user device 10 with the finger is the vehicle pick-up position. The vehicle pick-up position may be determined based on the position in the GPS receiver included in the user device 10.

The display control unit 11 may display a screen that supports the input of the destination on the user interface 105. For example, the screen may have a form of directly inputting the destination or may be a map on which the input place is displayed. For example, the position on which the user taps the map displayed on the user interface 105 of the user device 10 with the finger is the destination.

The display control unit 11 may display a screen that supports the input of the vehicle dispatch date and time on the user interface 105. For example, the screen may have a form of directly inputting the vehicle dispatch date and time or may be a date and time selection screen on which a calendar and a clock are displayed.

The display control unit 11 may display a screen for confirming specifications of a candidate vehicle (type of vehicle, presence or absence of the autonomous driving function, and the like), an approximate boarding available time, and the like on the user interface 105. The candidate vehicle is a vehicle to be a candidate for being dispatched.

As an example, the display control unit 11 displays a map indicating a position of the candidate vehicle existing within a predetermined distance from the position of the user device 10 on the user interface 105. The specifications of the selected candidate vehicle may be displayed when the user taps the candidate vehicle displayed on the user interface 105 of the user device 10 with a finger. The display control unit 11 may display a form for inputting of the type of vehicles of the dispatched vehicle and the like on the user interface 105. In addition, when the user taps one of the candidate vehicles, the selected candidate vehicle may be set as a requested vehicle.

The display control unit 11 may display a vehicle dispatch determination button for fixing the vehicle pick-up position, the destination, the vehicle dispatch date and time, the requested vehicle, and the like on the user interface 105.

The display control unit 11 may display screens related to a settlement for the vehicle dispatch service and a point management screen on the user interface 105. The point is a virtual currency that can be used instead of currency as a compensation for services or goods. Examples of the point are a point that can be used only for the vehicle dispatch service, and miles in a mileage® in an airline company that can be used in allied companies. The points may be virtual currencies that can be used as a compensation for the vehicle dispatch service, used as a toll road fee, used as a vehicle checking fee, used as a vehicle inspection fee, used for exchange with fuel, and used for exchange with goods. The points are granted to the user according to the amount paid as compensation for vehicle dispatch service.

The acceptance unit 12 accepts the user operation related to the vehicle dispatch service. The acceptance unit 12 is realized mainly by the processor 101 causing the user interface 105 to operate referring to the memory 102 and the storage 103. Examples of the user operation relating to the vehicle dispatch service include an operation for inputting the vehicle pick-up position, the type of vehicles, and the destination, an operation for selecting the requested vehicle, an operation for selecting the vehicle dispatch determination button, an operation related to the settlement, and an operation relating to the points.

The vehicle dispatch request unit 13 performs processing relating to a vehicle dispatch request. The vehicle dispatch request unit 13 is realized mainly by the processor 101 causing the communication interface 104 to operate while referring to the memory 102 and the storage 103. The vehicle dispatch request unit 13 causes the display control unit 11 and the acceptance unit 12 to operate, and acquires at least the vehicle pick-up position necessary for the vehicle dispatch request. The vehicle dispatch request unit 13 causes the display control unit 11 and the acceptance unit 12 to operate, and acquires the destination, the vehicle dispatch date and time, and the requested vehicle. The vehicle dispatch request unit 13 generates request data for transmitting the vehicle pick-up position, the destination, the vehicle dispatch date and time, the requested vehicle, and the like fixed by the user's selection of the vehicle dispatch decision button to the server 30. The request data includes at least the vehicle pick-up position. The request data may include the destination, the vehicle dispatch date and time, the requested vehicle, and the like.

The terminal communication unit 14 communicates with the server 30. The terminal communication unit 14 is realized mainly by the processor 101 causing communication interface 104 to operate while referring to the memory 102 and the storage 103. The terminal communication unit 14 receives information necessary for a vehicle dispatch determination from the server 30. As an example, the terminal communication unit 14 transmits at least one of the current position of the terminal and the boarding position to the server 30, and receives the information necessary for the vehicle dispatch determination according to the transmission. The information necessary for the vehicle dispatch determination is, for example, the position of candidate vehicle, the vehicle specifications, and the like. Furthermore, the terminal communication unit 14 transmits the request data to the server 30. The terminal communication unit 14 transmits the request data to the server 30, and receives the details of the dispatched vehicle (vehicle identification number of the dispatched vehicle, information on the driver, whether the vehicle is an autonomous driving vehicle or not, charge per unit time, points to be granted and the like) from the server 30.

Next, functions of the server 30 will be described. First, the data stored in the server 30 will be described. The storage 303 of the server 30 stores information on the registered vehicles. The registered vehicles are vehicles registered in advance in the vehicle dispatch system 100. A vehicle identification number is assigned to each registered vehicle. The vehicle identification number is an ID for identifying the vehicle. The vehicle identification number may be a number assigned by the vehicle dispatch system 100 in association with the unique vehicle number (the vehicle number written on a number plate, the vehicle body number stamped on the vehicle body, the physical address allocated to the communication equipment, and the like), or may be a vehicle unique number itself.

FIG. 4 illustrates an example of data stored in the server 30. As illustrated in FIG. 4, the storage 303 stores the current position of the vehicle, the current driving state, the presence or absence of the driver, the presence or absence of the autonomous driving function, a vehicle dispatch plan, and the like in association with the vehicle identification number. The position of the vehicle is a position on the map, for example is latitude and longitude. The driving state is either the autonomous driving or the manual driving. The presence or absence of the autonomous driving function represents the possibility of the autonomous driving, and is information for determining whether or not the autonomous driving can be performed on the vehicle. The vehicle dispatch plan is a vehicle dispatch schedule. The vehicle dispatch plan is data in which the position of the vehicle, the speed, the destination, the boarding schedule and the like, and the scheduled time are associated with each other.

The current position of the vehicle, the current driving state, the presence or absence of the driver, presence or absence of the autonomous driving function are acquired from at least one of the vehicle 2 and the roadside communication infrastructure, and is updated at a predetermined timing. The vehicle dispatch plan is generated for each registered vehicle by the server 30, and is updated at a predetermined timing.

As an example, in FIG. 4, the vehicle identification number: "2A" is associated with the position of the vehicle: "longitude XX, latitude XX", the driving state: "autonomous driving", the presence or absence of the driver: "Yes", the presence or absence of the autonomous driving function: "yes", and the vehicle dispatch plan: "vehicle dispatch plan A". In addition, the vehicle identification number "2B" is associate with the position of the vehicle: "longitude XX, latitude XX", the driving state: "manual driving", the presence or absence of the driver: "Yes", the presence or absence of the autonomous driving function: "No", the vehicle dispatch plan: "vehicle dispatch plan B". In addition, the vehicle identification number "2C" is associate with the position of the vehicle: "longitude XX, latitude XX", the driving state: "autonomous driving", the presence or absence of the driver: "No", the presence or absence of the autonomous driving function: "Yes", the vehicle dispatch plan: "vehicle dispatch plan C". In addition, the vehicle identification number "2D" is associate with the position of the vehicle: "longitude XX, latitude XX", the driving state: "manual driving", the presence or absence of the driver: "yes", the presence or absence of the autonomous driving function: "Yes", the vehicle dispatch plan: "vehicle dispatch plan D". The data illustrated in FIG. 4 is an example, and may include other information.

FIG. 5 illustrates an example of the user data stored in the server 30. As illustrated in FIG. 5, the storage 303 stores the points, a usage history, and the like in association with the user ID. The usage history is the date and time of using the vehicle dispatch service in the past such as the boarding position, the destination, and the like. The points and the usage history are updated by server 30 every time the user uses the vehicle dispatch service. In addition, the points are appropriately updated by the server 30 at the timing of being consumed by the user. The data illustrated in FIG. 5 is an example, and may include other information.

The server 30 includes a server communication unit 31, an information management unit 32, a vehicle dispatch processing unit 33, an accounting unit 34, a point management unit 35, a search unit 36 and a grant unit 37.

The server communication unit 31 communicates with the user device 10 and the vehicle 2. Function of the server communication unit 31 is realized mainly by the processor 301 causing the communication interface 304 to operate while referring to the memory 302 and the storage 303.

The information management unit 32 updates the data stored in the server 30. The information management unit 32 is realized mainly by the processor 301 performing a calculation referring to the memory 302 and the storage 303. As an example, the information management unit 32 updates the data illustrated in FIG. 4 when receiving the information from the vehicle 2.

The vehicle dispatch processing unit 33 generates information relating to the vehicle dispatch to be displayed on the user device 10. The vehicle dispatch processing unit 33 is realized mainly by the processor 301 performing the calculation referring to the memory 302 and the storage 303. As an example, the vehicle dispatch processing unit 33 determines the candidate vehicle based on at least one of the position of the user device 10 and the boarding position referring to the table of FIG. 4. The vehicle dispatch processing unit 33 transmits the information on the candidate vehicle to the user device 10 via the server communication unit 31.

The vehicle dispatch processing unit 33 acquires the request data from the user device 10 via the server communication unit 31, and determines the dispatched vehicle. The vehicle dispatch processing unit 33 generates the vehicle dispatch plan for the dispatched vehicle and causes the information management unit 32 to update the table in FIG. 4. The vehicle dispatch processing unit 33 transmits the details of the dispatched vehicle to the user device 10 via the server communication unit 31. The vehicle dispatch processing unit 33 transmits the information on the boarding position and the user to the dispatched vehicle.

The accounting unit 34 calculates a charge which is the compensation for the pick-up based on the distance from the boarding position to the destination and the boarding time. The accounting unit 34 is realized mainly by the processor 301 performing the calculation referring to the memory 302 and the storage 303 and performing calculation. The accounting unit 34 transmits the calculated charge to the user via the server communication unit 31. The accounting unit 34 may perform the accounting processing in cooperation with a credit server (not illustrated).

The point management unit 35 manages the points owned by the user. The point management unit 35 is realized mainly by a processor 301 performing the calculation referring to the memory 302 and the storage 303. As an example, the point management unit 35 calculates the points according to the charged amount and updates the user data illustrated in FIG. 5. The point management unit 35 may perform the point management processing in cooperation with a point server (not illustrated).

When the dispatched vehicle cannot continue the autonomous driving to the destination during the autonomous driving of the dispatched vehicle on which the user is boarded, the search unit 36 searches for a first alternative moving object to which the user can transfer within a predetermined time from alighting from the vehicle, at a boarding position within a predetermined distance from the position on the route to an end position of the autonomous driving of the dispatched vehicle. The search unit 36 is realized mainly by the processor 301 performing the calculation referring to the memory 302 and the storage 303.

The case where the dispatched vehicle cannot continue the autonomous driving to the destination means a case of a situation in which the autonomous driving function cannot be realized or a case when such a situation is predicted. As examples of such a scene include when an accident or construction occurred on the route to the destination, when the accuracy of the sensor that detects the position of dispatched vehicle deteriorates, when the road environment changes greatly, when the weather is getting worse, and when the movement of surrounding vehicles is irregular. When these events occur or can be predicted to occur, that is the case where the vehicle cannot continue the autonomous driving to the destination. The dispatched vehicle (vehicle 2) may predict or determine, or the server 30 may predict or determine the case where the dispatched vehicle cannot continue the autonomous driving to the destination. The search unit 36 acquires a result of prediction or a result of determination from at least one of the dispatched vehicle and the server 30.

The end position of the autonomous driving of the dispatched vehicle is a position at which the dispatched vehicle ends the autonomous driving when the dispatched vehicle cannot continue the autonomous driving to the destination. The first alternative moving object is a conveyance such as a vehicle having an autonomous driving function, a vehicle of manual driving, public transportation services (bus line, subway), a motorcycle, a bicycle and the like. Whether the public transportation service can be the first alternative moving object or not is determined by acquiring a travel plan from another server (not illustrated).

The search unit 36 determines the boarding position within a predetermined distance from the position on the route to the end position based on the position of the dispatched vehicle and the end position of the autonomous driving. The predetermined distance is set as such a position as, for example, the user can move on foot. Then, the search unit 36 calculates a time required to move from the current position of the dispatched vehicle to the boarding position. The search unit 36 determines the moving object that exists within the predetermined distance from the boarding position after a time to move to the boarding position elapsed as a candidate moving object to which the user can transfer with reference to the vehicle dispatch plan in FIG. 4. The search unit 36 calculates a transfer time it takes for the user transfers to the candidate moving object at the boarding position. The search unit 36 determines the candidate moving object having the shortest transfer time as the first alternative moving object.

The search unit 36 may search for the first alternative moving object when the result of prediction or the result of determination is acquired from at least one of the dispatched vehicle and the server 30, or may start to search for the first alternative moving object when the user wants to transfer. Hereinafter, as an example, a case where the user wants to transfer will be described.

The vehicle dispatch processing unit 33 generates proposal information to be displayed on the user device 10, when the dispatched vehicle cannot continue the autonomous driving to the destination. The proposal information includes options that user can take. As an example, the proposal information includes transfers, manual driving, walking and the like. The user device 10 receives the proposal information from the server 30, displays the options, and causes the user to determine a corresponding future actions.

A recommended order may be given to the proposal information items. For example, a corresponding recommended order is given to the options. Alternatively, the display order of the options is determined such that the option with the higher recommended order is displayed at the upper portion. When the distance between the current position and the destination of the dispatched vehicle is equal to or shorter than a predetermined distance, the vehicle dispatch processing unit 33 may set the recommended order of the transfer option lower than walking or the like.

When the first alternative moving object exists, the vehicle dispatch processing unit 33 notifies the user device 10 of the information of the first alternative moving object and the boarding position via the server communication unit 31, and transmits the boarding position (vehicle pick-up position) to the first alternative moving object.

The grant unit 37 grants a reward to the user when the first alternative moving object does not exist. The reward is an item, service, or right that benefits the user. Examples of reward include a gift, a discount ticket for services, points, and the like. The reward is to compensate for the disadvantage incurred to the user. As an example, a case where the reward is points will be described below.

The grant unit 37 increases the points of the user boarding on the dispatched vehicle when the first alternative moving object does not exist. The grant unit 37 specifies a current point of the user referring to the table illustrated in FIG. 4 based on the user ID of the user boarding on the dispatched vehicle. Then, the grant unit 37 adds a predetermined number of points to the current point. The predetermined number of points may be set in advance or may be increased as the distance from the end position of the autonomous driving to the destination increases.

The search unit 36 and the grant unit 37 described above configure the vehicle dispatch device 1.

Next, functions of the vehicle 2 will be described. As an example, the vehicle 2 includes a position acquisition unit 21, an occupant determination unit 22, and a vehicle communication unit 23. The vehicle 2 may include an autonomous driving unit 24.

The position acquisition unit 21 acquires a position of the vehicle 2 on the map. The position acquisition unit 21 is realized mainly by the processor 201 operating based on the information acquired from the GPS receiver.

The occupant determination unit 22 determines whether or not the occupant is seated on the driver's seat of vehicle 2. The occupant determination unit 22 is realized mainly by the processor 201 operating based on the information acquired from the seating sensor in the driver's seat.

The vehicle communication unit 23 communicates with the server 30. The vehicle communication unit 23 is realized mainly by the processor 201 operating the communication interface 204 referring to the memory 202 and the storage 203. The transmitted information includes information on the position of the vehicle 2, the driving state, the seating state on the driver's seat, and the autonomous driving function. The received information includes the vehicle pick-up position. The received information may include information on the user who issued the vehicle dispatch request.

The autonomous driving unit 24 causes the vehicle 2 to travel in the autonomous driving. The autonomous driving unit 24 realizes the autonomous driving based on the detection information by a sensor or the like (not illustrated), map information and the like. The autonomous driving unit 24 may determine whether or not the autonomous driving can be continued to the destination during the autonomous driving. The received vehicle pick-up position is set as the destination when the vehicle 2 has the autonomous driving function and travels in the autonomous driving.

Operation Example

Vehicle Dispatch Processing

Figure 6:
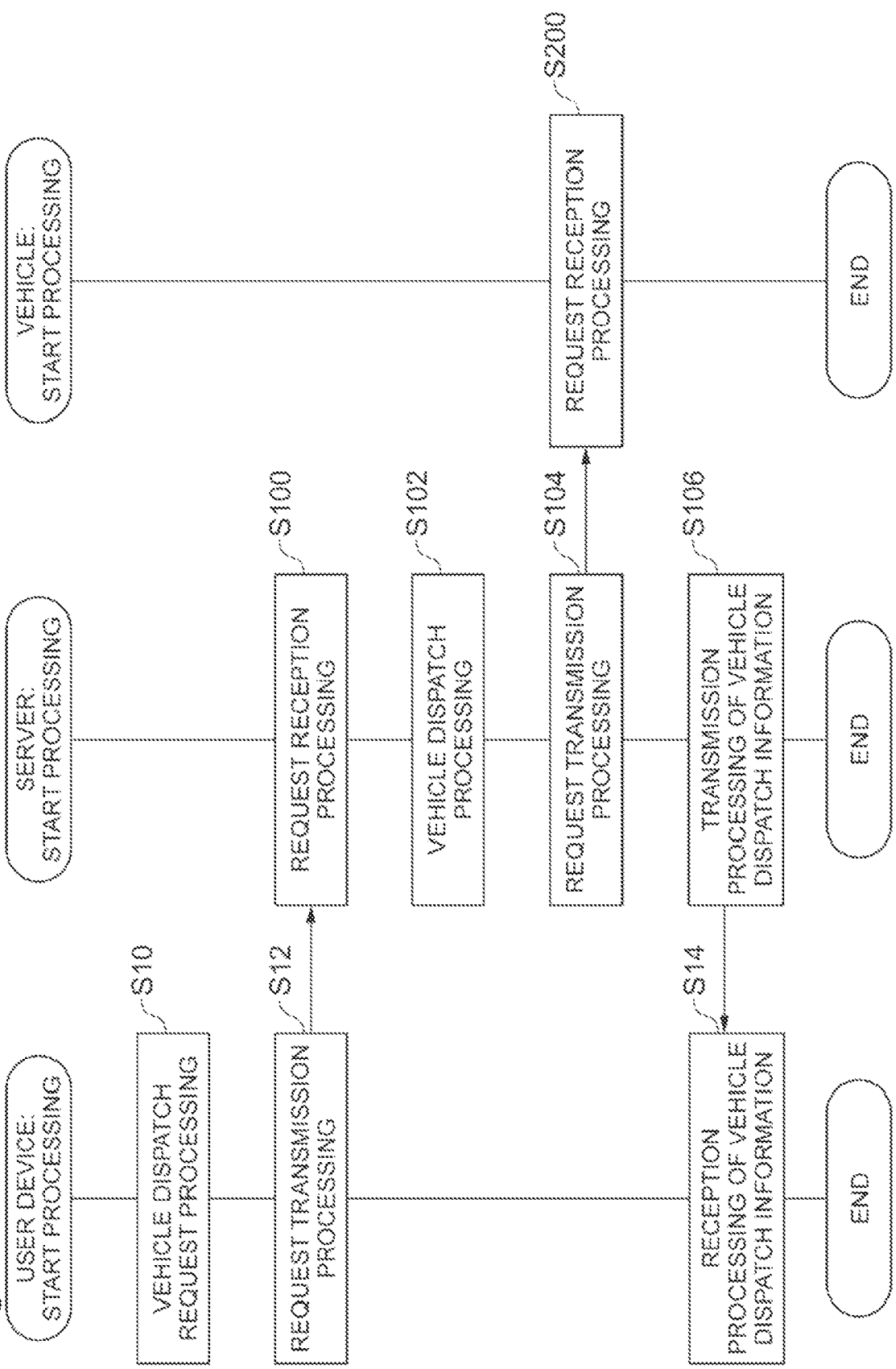
FIG. 6 is a flowchart illustrating an example of operations performed by the vehicle dispatch system.

FIG. 6 is a flowchart illustrating an example of the operation performed by the vehicle dispatch system 100. The flowchart in FIG. 6 is executed, for example, at a timing when the user device 10 and the server 30 are in activation states and the user starts vehicle dispatch processing with a vehicle dispatch application of the user device 10. Before the start of the flowchart in FIG. 6, it is assumed that the server 30 has acquired the position of the registered vehicle.

As illustrated in FIG. 6, the vehicle dispatch request unit 13 of the user device 10 determines the vehicle pick-up position, the destination, the requested vehicle and the like as the vehicle dispatch request processing (S10). For example, the user device 10 displays a map including the candidate vehicle on the user interface 105, and determines the vehicle pick-up position, the destination, the requested vehicle based on the user operation which is based on the map. Then, the vehicle dispatch request unit 13 generates request data including the vehicle pick-up position, the destination, and the vehicle identification number of the requested vehicle.

Subsequently, the vehicle dispatch request unit 13 transmits the request data generated in the vehicle dispatch request processing (S10) to the server 30 via the terminal communication unit 14 as request transmission processing (S12).

The server communication unit 31 of the server 30 receives the request data from the user device 10 as request reception processing (S100). The vehicle dispatch processing unit 33 of the server 30 determines a dispatched vehicle from the registered vehicles according to the request data as vehicle dispatch processing (S102). The vehicle dispatch processing unit 33 transmits the vehicle pick-up position, the destination and the user information to the vehicle 2 which is the dispatched vehicle via the server communication unit 31 as request transmission processing (S104). The vehicle communication unit 23 of the vehicle 2 receives the vehicle pick-up position, the destination and the user information as request reception processing (S200).

Subsequently, the vehicle dispatch processing unit 33 of the server 30 transmits the vehicle dispatch information (the vehicle pick-up position, the type of the vehicle, the vehicle identification number, and the like) to the user device 10 via the server communication unit 31 as transmission processing (S106) of the vehicle dispatch information. The terminal communication unit 14 of the user device 10 receives the vehicle dispatch information as reception processing (S14) of the vehicle dispatch information. When the reception processing (S14) is completed, the flowchart in FIG. 6 ends.

Point Management Processing

Figure 7:
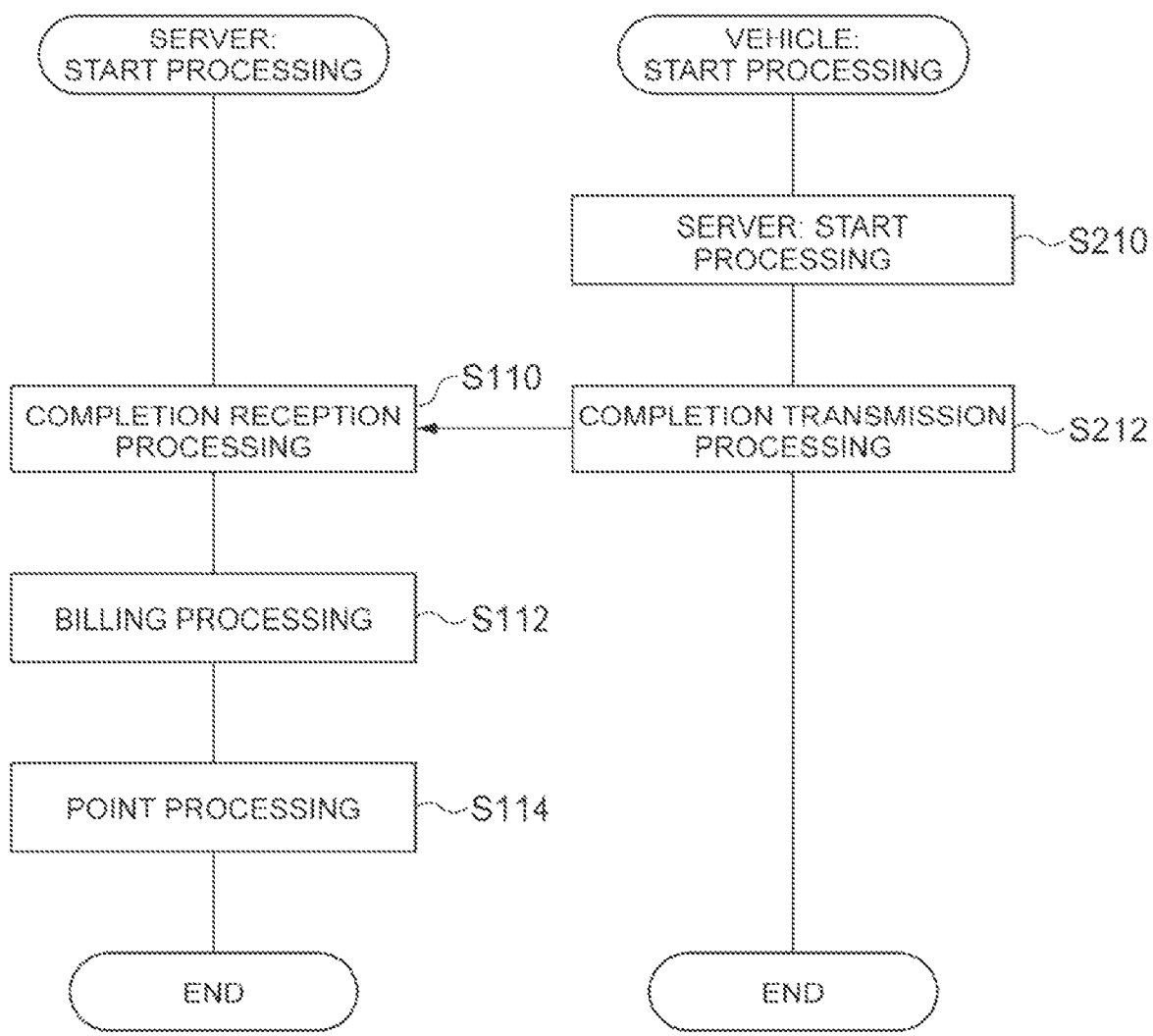
FIG. 7 is a flowchart illustrating an example of operations performed by the vehicle dispatch system.

FIG. 7 is a flowchart illustrating an example of the operation of the vehicle dispatch system 100. The flowchart in FIG. 7 is executed after the execution of the flowchart in FIG. 6.

As arrival determination processing (S210), the vehicle 2 determines whether or not the user arrives at the destination in a state in which the user is boarded. When it is determined that the user arrives at the destination in a state in which the user is in the arrival determination processing (S210), the vehicle communication unit 23 of the vehicle 2 transmits a travel distance from the boarding position and the boarding time to the server 30 as completion transmission processing (S212). The server communication unit 31 of the server 30 receives the travel distance from the boarding position and the boarding time from the vehicle 2 as completion reception processing (S110).

The accounting unit 34 of the server 30 calculates the compensation for the vehicle dispatch service as billing processing (S112) based on the travel distance and the boarding time received in the completion reception processing (S110). The accounting unit 34 transmits an amount for the service to the user device 10 via the server communication unit 31. The accounting unit 34 may perform the accounting processing in cooperation with the credit server.

Subsequently, as point processing (S114), the point management unit 35 of the server 30 calculates the acquired point based on the compensation calculated in the billing processing (S112). The point management unit 35 updates the table in FIG. 5 and transmits the acquired point to the user device 10 via the server communication unit 31. When the point processing (S114) is completed, the flowchart in FIG. 7 ends.

Processing at End of Autonomous Driving

Figure 8:
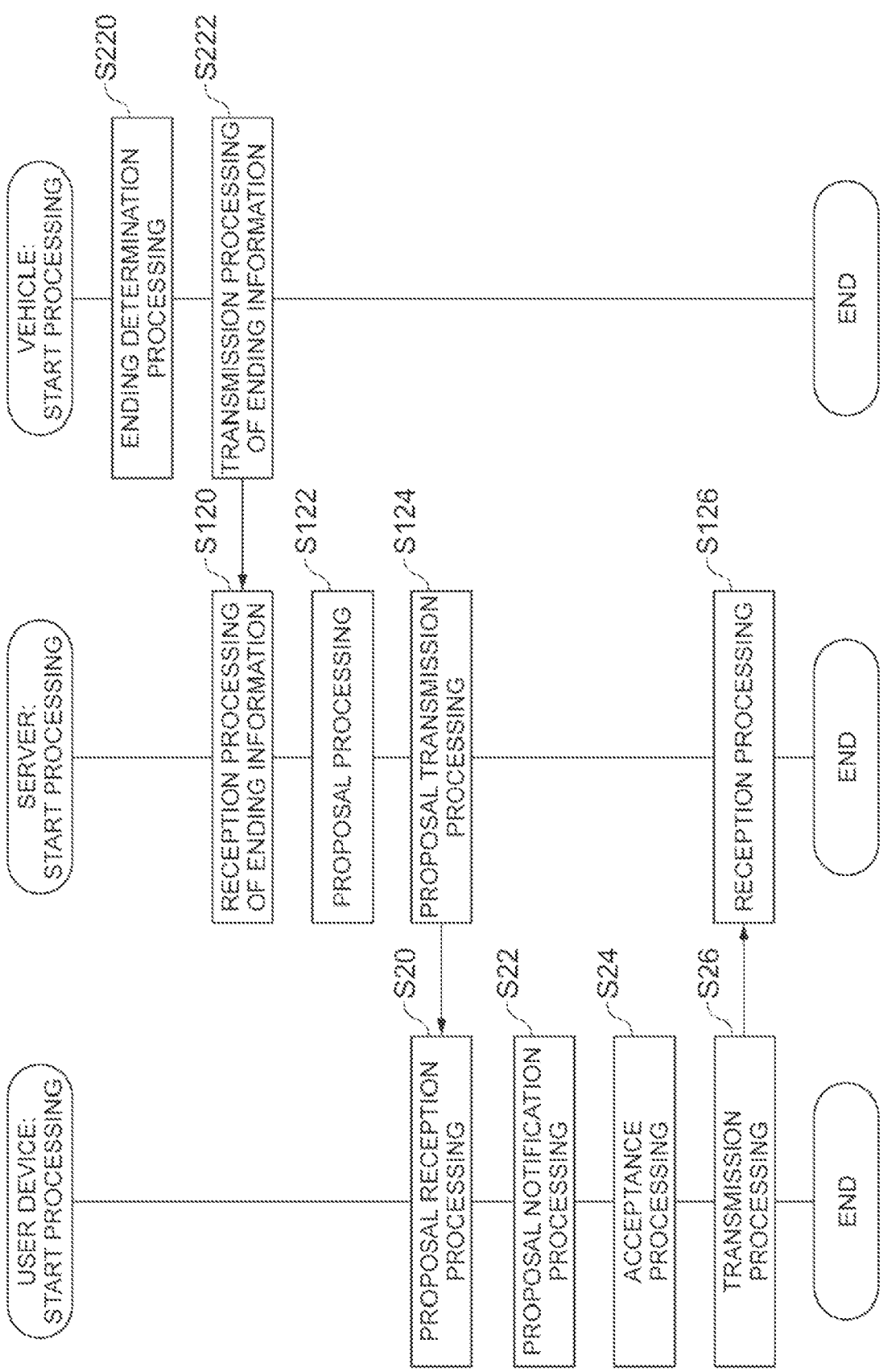
FIG. 8 is a flowchart illustrating an example of operations performed by the vehicle dispatch system when the autonomous driving cannot be continued.

FIG. 8 is a flowchart illustrating an example of the operations performed by the vehicle dispatch system 100 when the autonomous driving cannot be continued. The flowchart illustrated in FIG. 8 is executed during the autonomous driving of the dispatched vehicle.

The autonomous driving unit 24 of the vehicle 2 determines that the ending of autonomous driving is predicted as ending determination processing (S220). For example, the autonomous driving unit 24 acquires information that the construction is occurring on the traveling route through the communication, and predicts that the autonomous driving may end. The autonomous driving unit 24 of the vehicle 2 transmits the ending information including the position expected to cause the ending of autonomous driving to the server 30 via the vehicle communication unit 23 as transmission processing (S222).

The server communication unit 31 of the server 30 receives the ending information as reception processing (S120). As proposal processing (S122), the vehicle dispatch processing unit 33 of the server 30 generates proposal information including the options that the user can take. As proposal transmission processing (S124), the vehicle dispatch processing unit 33 transmits the proposal information to the user device 10 via the server communication unit 31.

As proposal reception processing (S20), the terminal communication unit 14 of the user device 10 receives the proposal information. As proposal notification processing (S22), the display control unit 11 of the user device 10 causes the user interface 105 to display an image based on the proposal information. As acceptance processing (S24), the acceptance unit 12 of the user device 10 accepts the user operation for selecting the options. As transmission processing (S26), the terminal communication unit 14 transmits the option selected by the user operation to the server 30. As reception processing (S126), the server 30 receives the option selected by the user operation. When the reception processing (S126) is completed, the flowchart in FIG. 8 ends.

Granting Reward

Figure 9:
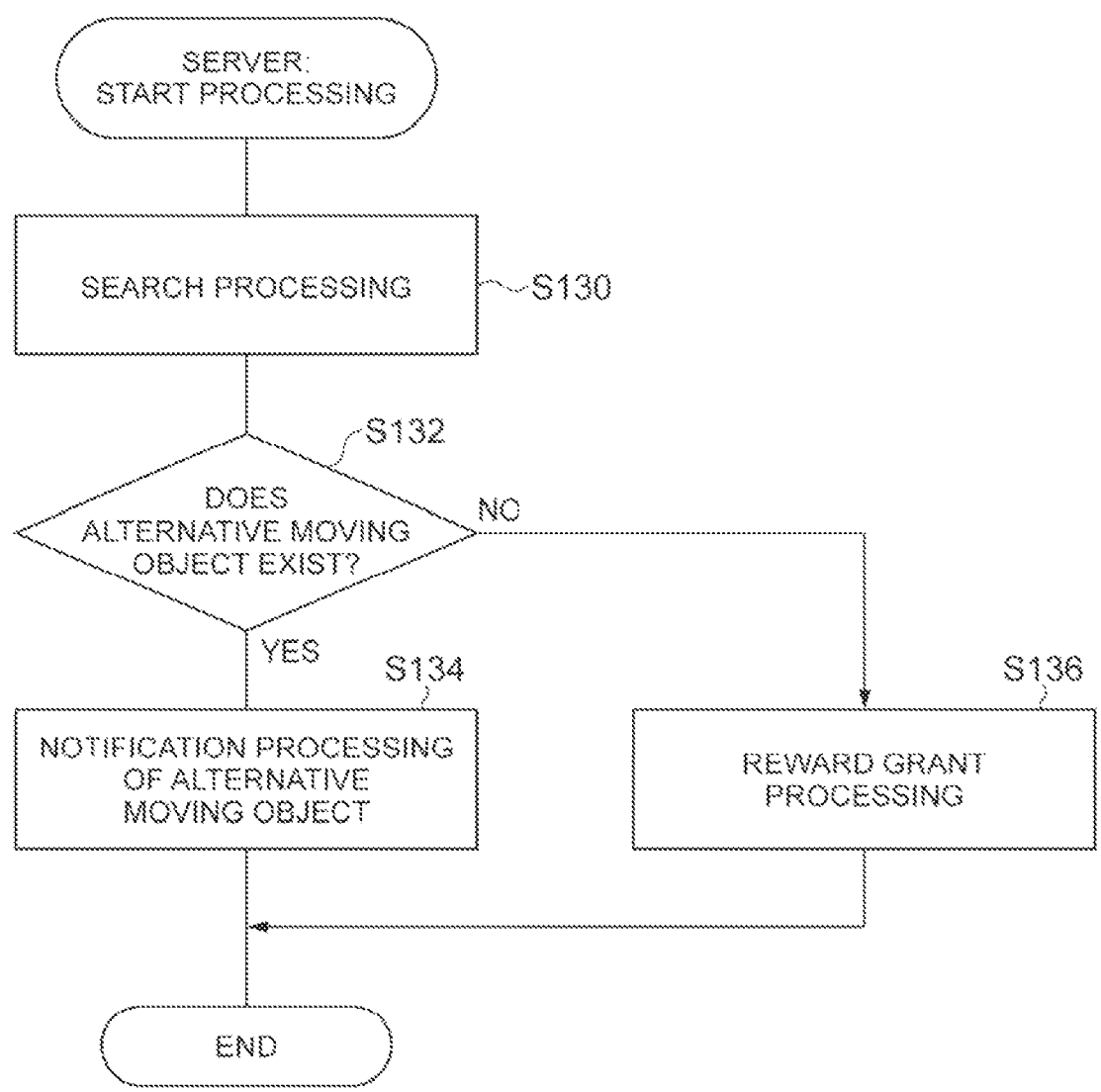
FIG. 9 is a flowchart illustrating an example of an operation relating to granting a reward performed by the vehicle dispatch system.

FIG. 9 is a flowchart illustrating an example of an operation relating to granting a reward performed by the vehicle dispatch system 100. The flowchart in FIG. 9 is executed when the option selected by the user operation in the reception processing (S126) in FIG. 8 is to transfer to another moving object.

As search processing (S130), the search unit 36 of the server 30 searches for a first alternative moving object to which the user can transfer within a certain time from alighting from the vehicle. As the determination processing (S132), the search unit 36 determines whether the first alternative moving object exists or not. The search unit 36 determines a candidate moving object having the shortest transfer time as the first alternative moving object.

When it is determined that the first alternative moving object exists (YES in S132), as notification processing (S134), the vehicle dispatch processing unit 33 of the server 30 transmits the information on the first alternative moving object, a transfer position, a transfer time, and the like to the user device 10. When a distance between the host vehicle position and the user device 10 is within a predetermined distance, the first alternative moving object may display the arrival on the display unit included in the first alternative moving object or may output the sound to the speaker included in the first alternative moving object.

When it is determined that the first alternative moving object does not exist (NO in S132), as reward grant processing (S136), the grant unit 37 of the server 30 increases the points of the user. When at least one of the notification processing (S134) and the reward grant processing (S136) is completed, the flowchart in FIG. 9 ends.

Summary of First Embodiment

According to the server 30 of the vehicle dispatch system 100, when the vehicle 2 cannot continue the autonomous driving to the destination and when the first alternative moving object to which the user can transfer does not exist, the reward is granted to the user by the grant unit 37. The reward is a compensation for the disadvantages. Therefore, the server 30 can reduce the disadvantages the user suffers when the vehicle 2 on which the user is boarded cannot continue the autonomous driving to the destination during the autonomous driving of the vehicle 2. In addition, the server 30 can specify an alternative moving object to which the user can transfer within the shortest time or distance.

Second Embodiment

A vehicle dispatch system in a second embodiment is different in a point that the operation relating to granting the reward is different from that in the vehicle dispatch system 100 in the first embodiment, and others are the same. In the second embodiment, the description the same as those in the first embodiment will not be repeated.

A configuration of the vehicle dispatch system in the second embodiment is the same as the vehicle dispatch system 100.

Figure 10:
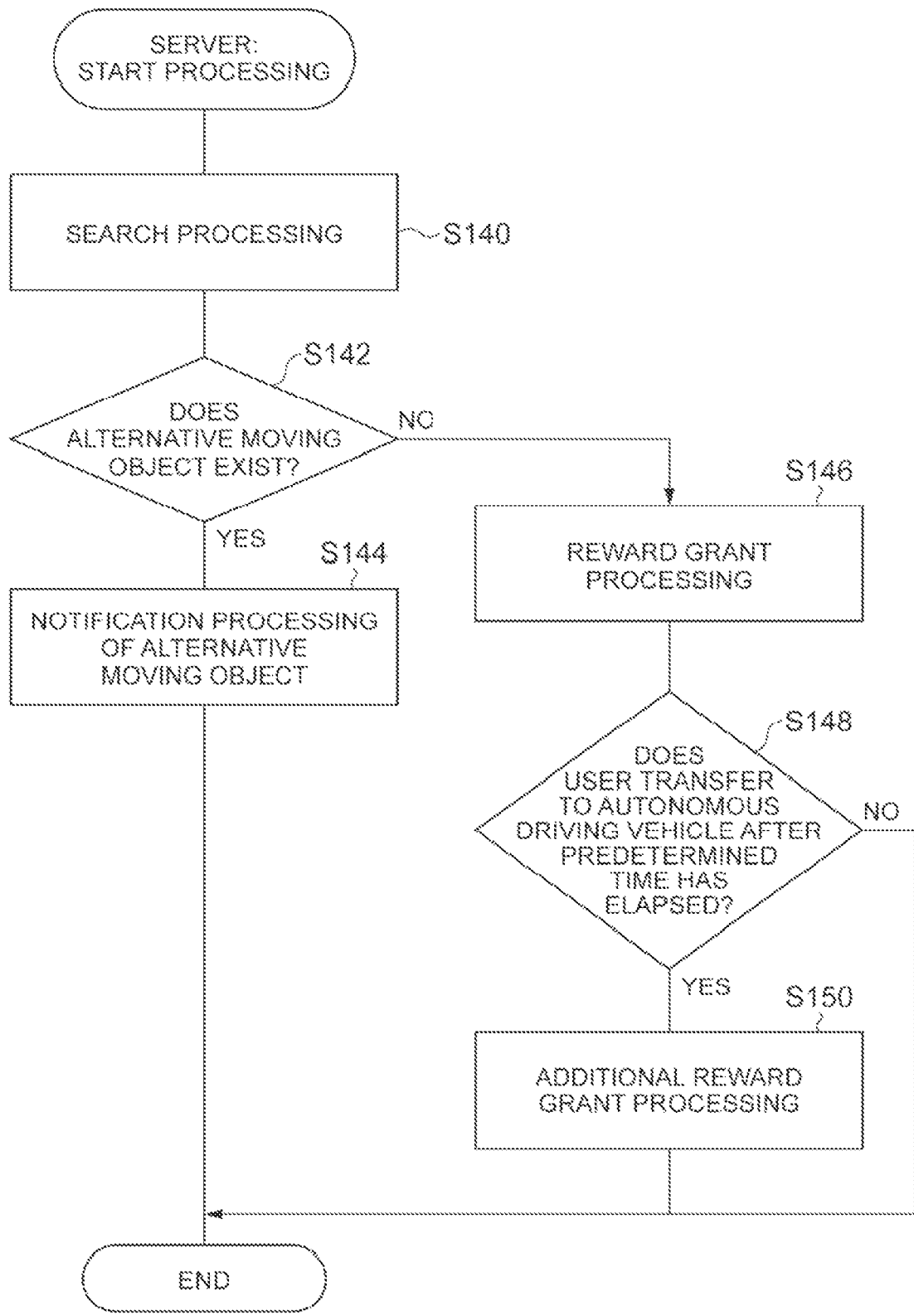
FIG. 10 is a flowchart illustrating an example of an operation relating to granting an additional reward performed by the vehicle dispatch system.

FIG. 10 is a flowchart illustrating an example of an operation relating to granting an additional reward performed by the vehicle dispatch system. The flowchart in FIG. 10 is executed when the option selected by the user operation in the reception processing (S126) in FIG. 8 is to transfer to another moving object.

The search processing (S140), the determination processing (S142), the notification processing (S144) and the reward grant processing (S146) are the same as the search processing (S130), the determination processing (S132), the notification processing (S134) and the reward grant processing (S136) in FIG. 9. A predetermined time used in the determination processing (S142) will be described as an allowable transfer time.

As determination process (S148), the server 30 determines whether or not the user transferred to the vehicle 2 having an autonomous driving function after a predetermined time has elapsed. First, the search unit 36 of the server 30 searches for a second alternative moving object having the autonomous driving function, which to which the user can transfer, at the boarding position after the allowable transfer time has elapsed. The server 30 notifies the user device 10 of the second alternative moving object when the second alternative moving object exists. The user device 10 issues a vehicle dispatch request to the server 30 when the user operation for dispatching the second alternative moving object is accepted. The server 30 sends the second alternative moving object to the boarding position. The server 30 receives a notification of boarding completion from the vehicle 2. When the notification of boarding completion is received, the server 30 determines that the user transferred to the vehicle 2 having the autonomous driving function after the predetermined time has elapsed.

When it is determined that the user transferred to the vehicle 2 having an autonomous driving function after the predetermined time has elapsed (YES in S148), as additional reward grant processing (S150), the grant unit 37 grants an additional reward to the user. The grant unit 37 increases the user's point.

When it is determined that the user did not transfer to the vehicle 2 having an autonomous driving function after the predetermined time has elapsed (NO in S148), and when at least one of the notification processing (S144) and the additional reward grant processing (S150) is completed, the flowchart in FIG. 10 ends.

Summary of Second Embodiment

According to the server 30 of the vehicle dispatch system 100, when the user can transfer to the vehicle 2 having the autonomous driving function, since the additional reward is granted, it is possible to urge the user to positively use the alternative moving object having the autonomous driving function. Since the user is losing reliability for the autonomous driving, the server 30 can contribute to the spread of the autonomous driving by granting the additional reward.

The embodiments described above can be implemented in various forms in which various changes and improvements are made based on knowledge of those skilled in the art.

The vehicle dispatch system 100 does not need to have a plurality of user devices but may include only one user device.

The case where the vehicle 2 and the user device 10 are connected to the server 30 via the same network N has been exemplified, but may be connected to the server 30 via networks different from each other.

The accounting unit 34 and the point management unit 35 of the server 30 may be realized by a server different from the server 30.

What is claimed is:

1. A vehicle dispatch device configured to dispatch an autonomous driving vehicle to a user, the device comprising a processor programmed to:
   search for a first alternative moving object when the dispatched autonomous driving vehicle on which the user is boarded cannot continue autonomous driving to a destination, the first alternative moving object to which the user can transfer within a predetermined allowable transfer time from a timing that the user alights from the dispatched autonomous driving vehicle;
   grant a first reward to the user and search for a second alternative moving object when the first alternative moving object does not exist, the second alternative moving object to which the user can transfer after the predetermined allowable transfer time from a timing that the user alights from the dispatched autonomous driving vehicle; and
   grant a second reward to the user when the user transfers to the second alternative moving object.

2. The vehicle dispatch device according to claim 1, wherein the processor is further programmed to present to the user proposal information during the autonomous driving of the autonomous driving vehicle, the proposal information including an option for transfer to the first alternate vehicle, when the autonomous driving vehicle cannot continue the autonomous driving to a destination.

3. The vehicle dispatch device according to claim 1, wherein the processor is further programmed to present to the user proposal information during the autonomous driving of the autonomous driving vehicle, the proposal information including an option for transfer to the second alternate vehicle, when the first alternative moving object does not exist.

4. A vehicle dispatch method for dispatch an autonomous driving vehicle to a user, the vehicle dispatch method comprising:
   searching for a first alternative moving object when the dispatched autonomous driving vehicle on which the user is boarded cannot continue autonomous driving to a destination, the first alternative moving object to which the user can transfer within a predetermined allowable transfer time from a timing that the user alights from the dispatched autonomous driving vehicle;
   granting a first reward to the user and searching for a second alternative moving object when the first alternative moving object does not exist, the second alternative moving object to which the user can transfer after the predetermined allowable transfer time from a timing that the user alights from the dispatched autonomous driving vehicle; and
   granting a second reward to the user when the user transfers to the second alternative moving object.

5. The vehicle dispatch method according to claim 4, further comprising presenting to the user proposal information during the autonomous driving of the autonomous driving vehicle, the proposal information including an option for transfer to the first alternate vehicle, when the autonomous driving vehicle cannot continue the autonomous driving to a destination.

6. The vehicle dispatch method according to claim 4, further comprising presenting to the user proposal information during the autonomous driving of the autonomous driving vehicle, the proposal information including an option for transfer to the second alternate vehicle, when the first alternative moving object does not exist.

7. A non-transitory computer readable medium having stored thereon instructions which, when executed by at least one processor, cause the at least one processor to execute processing comprising:

searching for a first alternative moving object when a dispatched autonomous driving vehicle on which a user is boarded cannot continue autonomous driving to a destination, the first alternative moving object to which the user can transfer within a predetermined allowable transfer time from a timing that the user alights from the dispatched autonomous driving vehicle;

granting a first reward to the user and searching for a second alternative moving object when the first alternative moving object does not exist, the second alternative moving object to which the user can transfer after the predetermined allowable transfer time from a timing that the user alights from the dispatched autonomous driving vehicle; and granting a second reward to the user when the user transfers to the second alternative moving object.

8. The non-transitory computer readable medium according to claim 7, wherein the processing further comprises presenting to the user proposal information during the autonomous driving of the autonomous driving vehicle, the proposal information including an option for transfer to the first alternate vehicle, when the autonomous driving vehicle cannot continue the autonomous driving to a destination.

9. The non-transitory computer readable medium according to claim 7, wherein the processing further comprises presenting to the user proposal information during the autonomous driving of the autonomous driving vehicle, the proposal information including an option for transfer to the second alternate vehicle, when the first alternative moving object does not exist.

* * * * *